United States Patent
Meier et al.

[11] Patent Number: 6,120,720
[45] Date of Patent: Sep. 19, 2000

[54] METHOD OF MANUFACTURING A PLASTIC EDGED GLASS SHELF

[75] Inventors: Max Meier; Karl-Heinz Meier, both of Lichtenau, Germany

[73] Assignees: Gemtron Corporation, Tenn.; Mecalit GmbH, Germany

[21] Appl. No.: 08/848,390

[22] Filed: May 8, 1997

Related U.S. Application Data

[63] Continuation of application No. 08/303,200, Sep. 8, 1994, abandoned.

[51] Int. Cl.[7] .............................. B29C 45/14; B29C 70/76
[52] U.S. Cl. .......................... 264/261; 264/274; 264/275; 264/277
[58] Field of Search ...................................... 264/250, 251, 264/252, 263, 267, 271.1, 275, 277, 274, 328.8, 328.12, 261; 425/130, 129.1

[56] References Cited

U.S. PATENT DOCUMENTS

| | | |
|---|---|---|
| 2,718,664 | 9/1955 | Schweitzer . |
| 3,263,014 | 7/1966 | Deisenroth . |
| 3,381,340 | 5/1968 | Chapin, Jr. . |
| 3,523,994 | 8/1970 | Shockey . |
| 4,072,340 | 2/1978 | Morgan . |
| 4,139,234 | 2/1979 | Morgan . |
| 4,561,625 | 12/1985 | Weaver . |
| 4,688,752 | 8/1987 | Barteck et al. . |
| 4,723,809 | 2/1988 | Kida et al. . |
| 4,732,553 | 3/1988 | Hofer . |
| 4,778,366 | 10/1988 | Weaver ................................... 264/254 |
| 4,925,511 | 5/1990 | Ikeda et al. ............................. 156/245 |
| 5,273,354 | 12/1993 | Herrmann et al. . |

*Primary Examiner*—Angela Ortiz
*Attorney, Agent, or Firm*—Diller, Ramik & Wight, PC

[57] ABSTRACT

This method involves the injection molding of a polymeric/copolymeric frame about a peripheral edge of glass panel in association with a pair of brackets to form a refrigerator shelf. The glass panel is placed in a cavity of a mold with a peripheral edge of the cavity corresponding to a peripheral edge of the glass panel. The cavity has side cavity portions each housing one of the shelf brackets. Polymeric/copolymeric synthetic plastic material is injected into the cavity preferably adjacent corners thereof such that the forces of the injected material are essentially self-balancing about the peripheral edge of the glass panel, thereby maintaining the glass panel in substantially mating conformity with the cavity to produce a relatively consistently contoured and cross-sectioned frame which, upon the solidification of the plastic material, also unites the shelf brackets to the glass panel.

40 Claims, 4 Drawing Sheets

METHOD OF MANUFACTURING A PLASTIC EDGED GLASS SHELF

This application is a continuation, of application Ser. No. 08/303,200, filed Sep. 8, 1994, now abandoned.

CROSS-REFERENCES TO RELATED APPLICATION

This application is directed to a novel method of constructing a refrigerator shelf having a plastic framed glass shelf of the type disclosed in U.S. patent application Ser. No. 08/067,800 filed on May 27, 1993, entitled Plastic Edged Glass Shelf.

BACKGROUND OF THE INVENTION

This invention is directed to a method of manufacturing a shelf, particularly a shelf adapted for utilization in a refrigerator of the type disclosed in the above-identified pending patent application. In the latter-identified pending patent application, several U.S. patents are noted in which a plate glass is bounded by a metal or plastic support frame. In U.S. Pat. No. 4,934,541 the plastic frame is made of an upper frame member and a lower frame member that cooperate to sandwich therebetween a periphery of a glass plate. A seal between the upper frame member and the glass plate prevents liquids from seeping between the glass plate and the upper frame member. In addition, the two frame members are ultrasonically welded together along a weld bead to unite the two frame members together and thus hold the glass shelf therebetween.

As noted in the above-identified pending patent application, a major problem with a multi-part plastic frame of the type disclosed in U.S. Pat. No. 4,934,541 is that the separate frame members must be separately manufactured, separately assembled, united with a glass panel and an associated seal, and thereafter unitized by the ultrasonic welding. The shelf of the pending application avoids these undesired characteristics through an in situ molding process by which a pair of shelf brackets are simultaneously interlockingly secured to side border portions of the plastic frame. In this manner the glass panel, the in situ molded plastic frame and the associated shelf brackets are essentially of a unitized construction which is extremely desirable from a manufacturing standpoint because of reduced costs and increased efficiencies. Also, from a use standpoint this construction is highly desirable because the integral homogeneous assembly of the shelf brackets, glass panel and frame is relatively strong and can be abused to a considerable extent absent deterioration and/or breakage. Additionally, the homogeneous nature of the overall in situ molding operation relative to the shelf brackets and the glass panel is aesthetically pleasing but, more importantly, this construction is highly sanitary because gaps and voids are nonexistent and, thus, spills or seepage can be readily and thoroughly cleaned with a minimum of effort.

A disadvantage of the in situ molding just described is that heretofore no provision has been made to maintain or assure proper alignment between the glass panel, the shelf brackets and the in situ injection molded frame during the high pressure injection and solidification of the latter. As molten plastic material is injected into an appropriate mold cavity under high pressure, there is a tendency for the glass panel to shift in the mold cavity because of differential forces acting against different portions of the glass panel. Due to the latter, the glass panel can undesirably shift in the mold cavity with the result that the injected plastic material, when solidified, is not properly oriented with respect to the peripheral edge of the glass panel and/or the shelf brackets associated therewith.

SUMMARY OF THE INVENTION

In keeping with the foregoing, a primary object of the present invention is to provide a novel method of forming a frame or border along a peripheral edge portion of an article, particularly a glass panel, and simultaneously unite thereto a pair of associated shelf brackets to form a refrigerator shelf. The method is performed by providing a mold having a cavity including a polygonal peripheral cavity portion corresponding substantially to a peripheral edge portion of the glass panel and generally parallel laterally spaced cavity portions each merging with the polygonal peripheral cavity portion. The glass panel is placed in the cavity with its peripheral edge portion located in the polygonal peripheral cavity portion of the mold cavity. One shelf bracket is placed in each lateral cavity portion with an upper edge of each shelf bracket being adjacent a side peripheral edge of the glass panel. Polymeric/copolymeric plastic material is injected under pressure into the polygonal peripheral cavity portion at a plurality of peripherally spaced positions which are so constructed and arranged as to their location to apply forces created by the pressurized plastic material against the peripheral edge portion of the glass panel to maintain the same substantially in mating substantially exact conformity with the polygonal peripheral cavity portion whereby a relatively consistently contoured frame is formed about the peripheral edge portion of the glass panel. The introduction of the pressurized polymeric/copolymeric plastic material into the polygonal peripheral cavity portion at selected peripherally spaced positions thereby essentially self-centers the glass panel in the mold cavity and the polymeric/copolymeric plastic material eventually solidifies to form a peripheral shelf border or frame which is accurately located relative to the entire peripheral edge of the glass panel and the two shelf brackets associated therewith.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1, is a highly enlarged cross-sectional view taken through one of the points of injection of the polymeric/copolymeric plastic material.

DESCRIPTION OF THE PREFERRED EMBODIMENT

Figure 1:
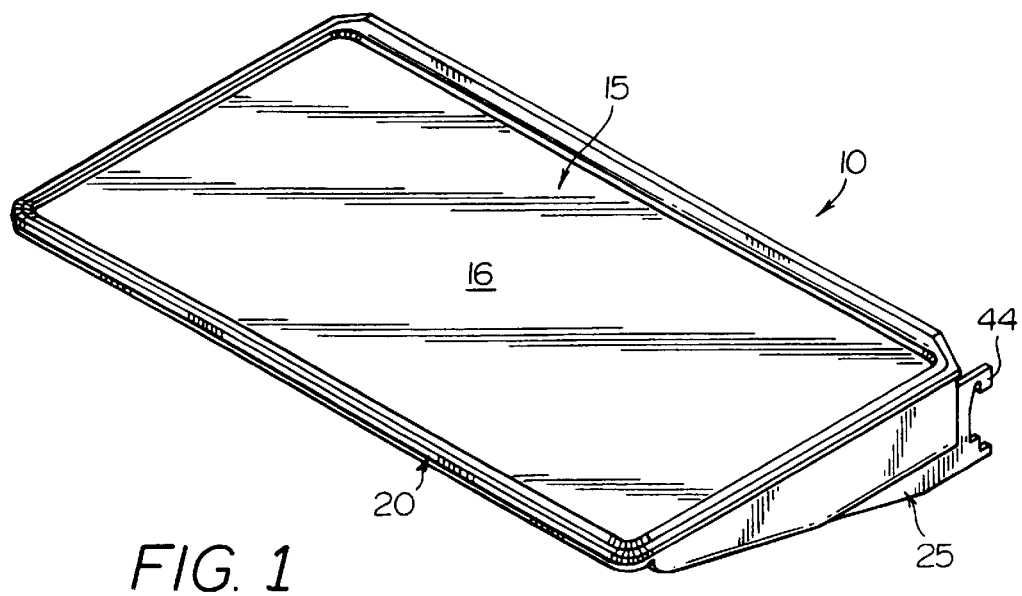
FIG. 1 is a top perspective view of a novel refrigerator shelf constructed in accordance with this invention, and illustrates a relatively flat glass member, panel or plate bounded by an in situ injection molded polymeric/copolymeric plastic material frame or border and one of a pair of cantilever support or shelf brackets with the specifics thereof being more fully illustrated in the latter-identified pending patent application.

Reference is made to FIG. 1 of the drawings which illustrates a refrigerator shelf of the present invention which is generally designated by the reference numeral 10.

The refrigerator shelf 10 is fully described in the earlier noted application and specific reference is made thereto for details beyond those set forth specifically herein. Essentially, the refrigerator shelf 10 includes a flat member 15, such as a transparent or translucent glass panel or plate; an in situ injection molded border or frame 20 of synthetic polymeric/copolymeric plastic material, such as polypropylene, and a pair of identical opposite parallel shelf brackets or bracket means 25, 25 (FIGS. 1 through 3).

Figure 6:
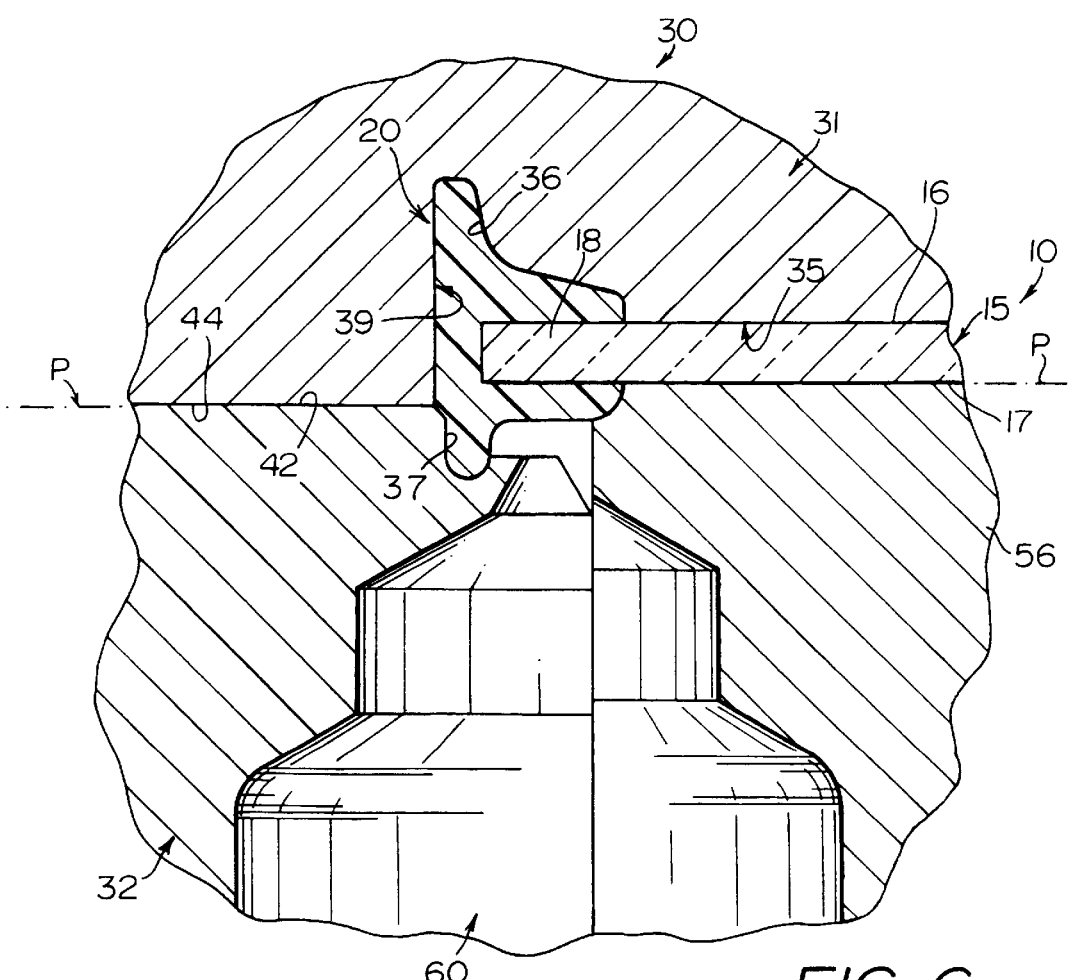
FIG. 6, which appears on the sheet of drawing containing
Figure 3:
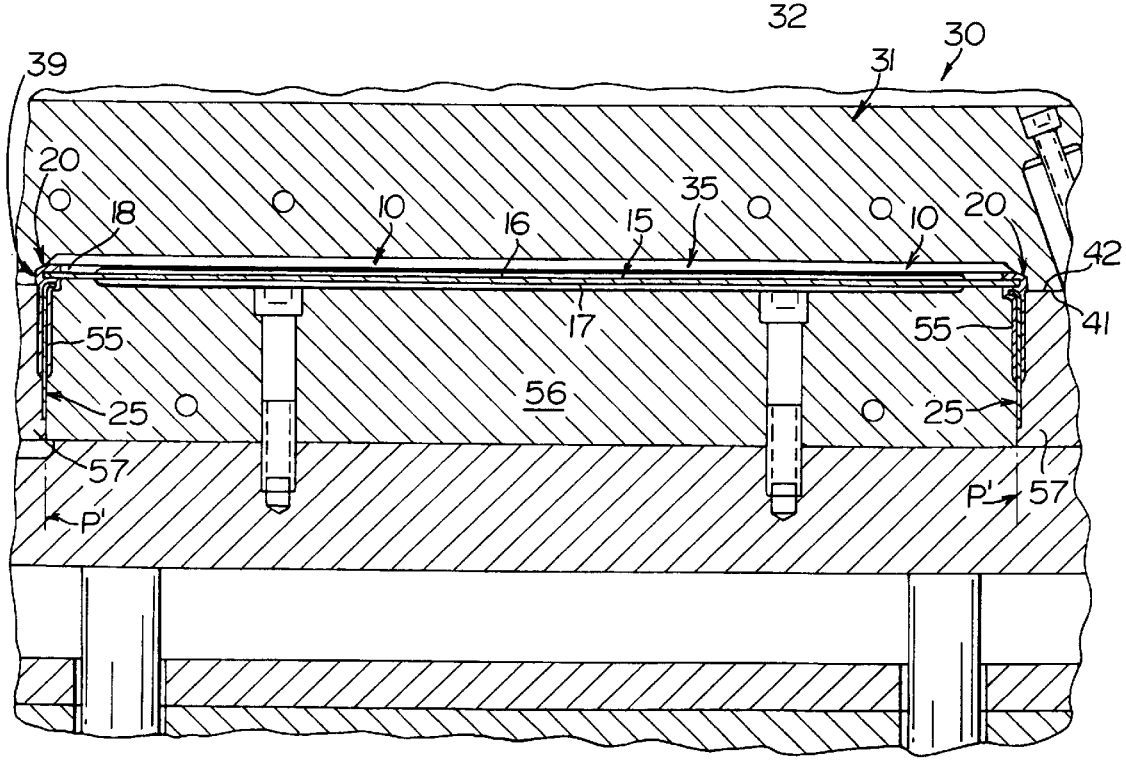
FIG. 3 is a vertical cross-sectional view of the mold of FIG. 2 taken through a vertical plane normal thereto, and more clearly illustrates both of the parallel laterally spaced side cavity portions and a cantilever shelf bracket housed in each.
Figure 4:
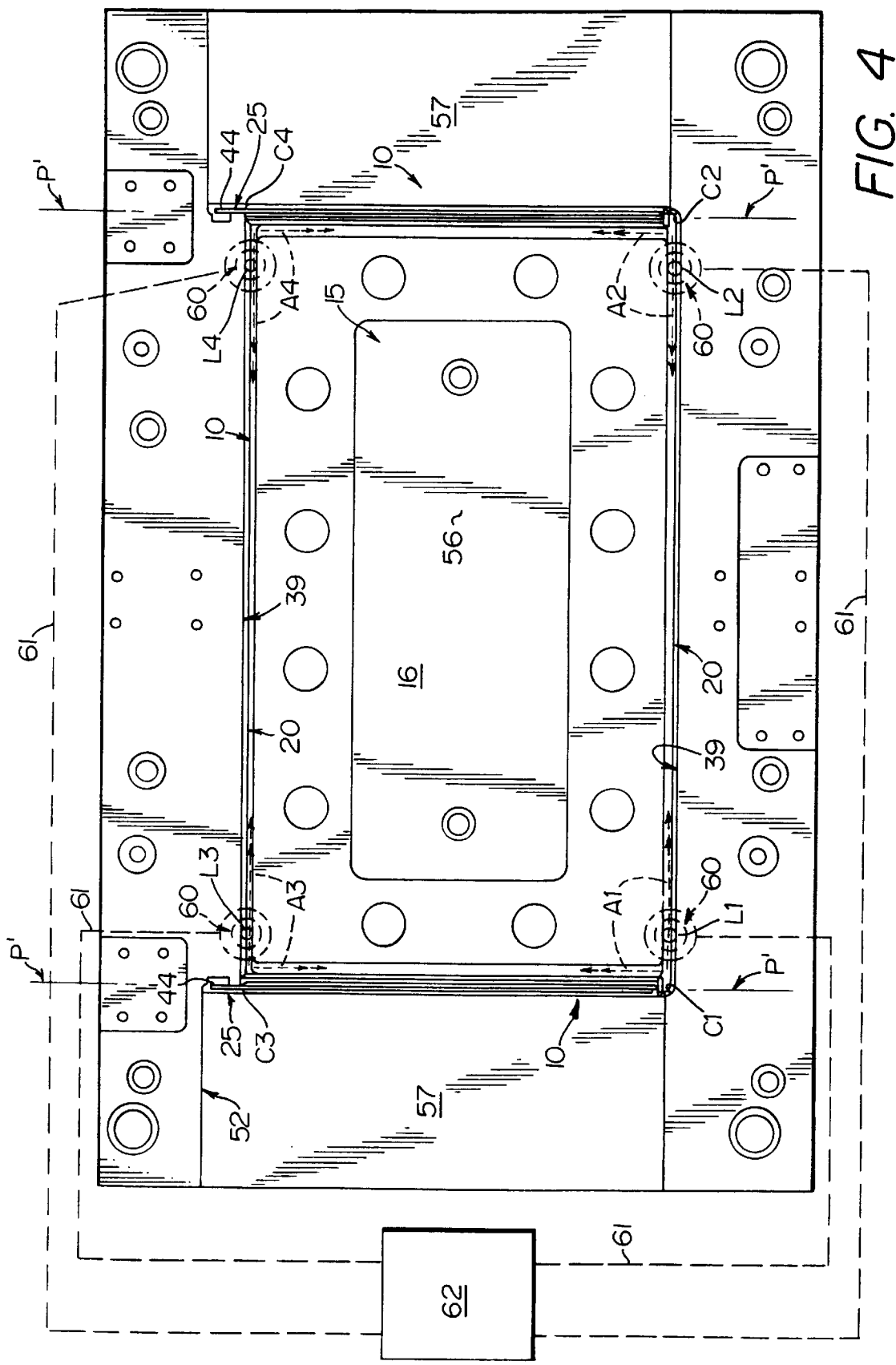
FIG. 4 is an horizontal plan view across the horizontal parting line or plane of the mold bodies of FIGS. 3 and 4, and illustrates the location of the shelf frame and particularly a peripheral border thereof with respect to four points contiguous corners of the polygonal peripheral cavity portion at which pressurized synthetic polymeric/copolymeric plastic material is injected by injectors into the cavity which maintains the glass panel substantially in accurate mating conformity with the mold cavity.

The glass plate or panel 15 includes an upper surface 16, a lower surface 17 (FIGS. 2 and 3) and a polygonally shaped peripheral edge or edge portion 18 (FIG. 6) imparting the generally polygonal/rectangular configuration to the overall glass panel 15, as is best shown in FIGS. 1 and 4.

Figure 2:
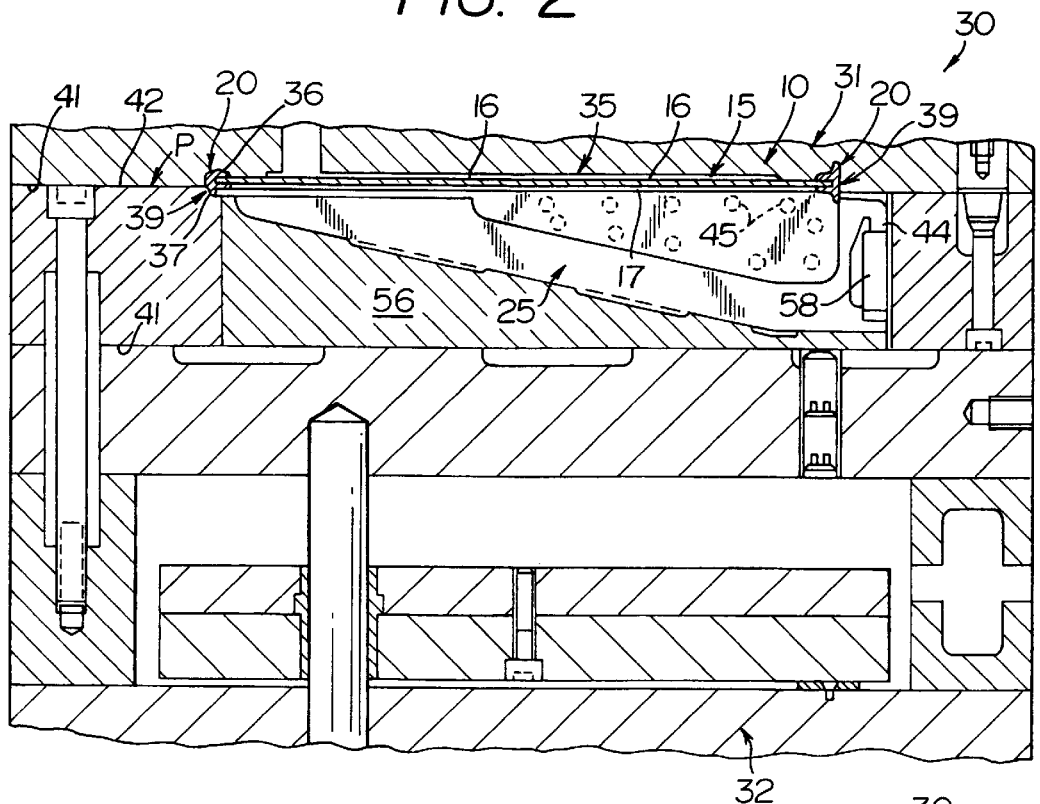
FIG. 2 is a vertical cross-sectional view taken through an injection mold of the present invention, and illustrates upper and lower mold bodies in their closed position with one of the pair of cantilever shelf brackets housed in one of a pair of parallel laterally spaced side cavity portions and the periphery of a glass panel located in a polygonal peripheral cavity portion of a mold cavity into which has been injected polymeric/copolymeric plastic material.

The shelf 10 is formed by placing the glass panel 15 and the shelf brackets 25, 25 in a cavity 35 of a mold 30 defined generally between an upper mold body 31 and a lower mold body 32 (FIGS. 2 and 3). The mold cavity 35 includes an upper peripheral cavity portion 36 (FIG. 6) formed in a mold body 31 and a lower peripheral cavity portion 37 formed in the lower mold body 32 which collectively define a generally polygonal shaped peripheral cavity portion 39 which essentially surrounds and encapsulates the polygonal peripheral edge 18 of the glass panel 15, as is most evident from FIGS. 1 and 6. When the mold bodies 31, 32 are closed, as shown in FIGS. 2 and 3, respective abutting horizontal surfaces 41, 42 define a horizontal parting plane P between the mold bodies 31, 32 to provide access into the mold cavity 35 for insertion of the brackets 25, 25, the glass panel 15 and the subsequent ejection of the finished/injection molded shelf 10.

The mold cavity 35 also includes two generally parallel laterally spaced cavity portions 55 (FIG. 3) defined between an innermost polygonal or rectangular central core 56 of the lower mold 52 and opposite laterally retractable side mold parts 57, 57 (FIG. 3). A vertical parting plane P' (FIG. 3) is defined between abutting vertical surfaces (unnumbered) of the central core 56 and the side mold parts 57, 57 which permits the introduction of the shelf brackets 25, 25 into the side cavity portions 55, 55 and the subsequent discharge of the shelf 10 upon the solidification of the frame 20. Lower edges (unnumbered) of the side cavity portions 55 are approximately the thickness of the shelf brackets 25 and receive the same relatively snugly therein, as is evident in FIGS. 2 and 3. More specifically, the opposing side surface (unnumbered) of the central core 56 and the side mold parts 57, 57 contact, grip and locate the lower edge of each of the associated shelf brackets 25, 25, as shown in FIGS. 2 and 3, and thereby accurately locate each shelf bracket 25 within its associated side cavity portion 55. If found necessary or desirable, a locating block or mechanism 58 (FIG. 2) can be associated with each side cavity portion 55 to cooperate with a mounting hook 44 of each shelf bracket 25 to further assure the accurate location of each shelf bracket 25 relative to its side cavity portion 55.

Figure 5:
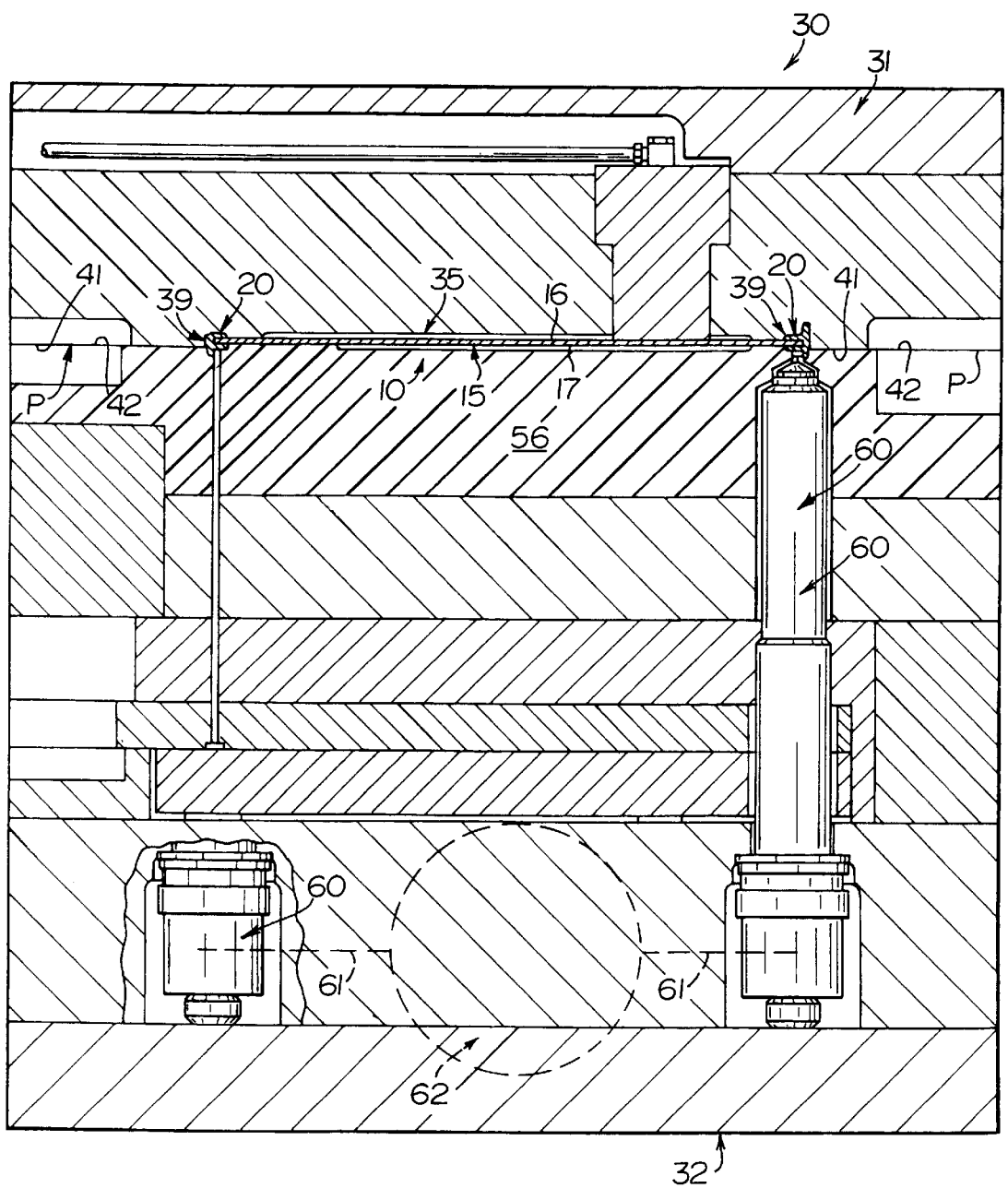
FIG. 5 is a vertical cross-sectional view through the mold cavity, and illustrates in further detail one of the four injectors.

One of four conventional injectors 60 is shown in FIG. 5 and the location (L1–L4) of each of the four injectors 60 is shown superimposed in phantom outline in FIG. 4. Each injector 60 is essentially located approximate each of four corners (C1–C4 of FIG. 4) of the polygonally shaped peripheral cavity portion 39. The corners C1, C2 are forward corners remote from the hooks 42 of the shelf brackets 25 and the corners C3, C4 are rear corners adjacent the hooks 42 of the shelf brackets 25. Each of the injectors 60 is conventionally connected by ports or high pressure lines 61 to a conventional plasticizer/injector of an injection molding machine 62 which injects heated polymeric/copolymeric plastic material under high pressure into the polygonally shaped peripheral cavity portion 39 at the four locations (L1–L4) illustrated in FIG. 4 after, of course, the glass panel 15 has been accurately located in the cavity 35 between the mold bodies 31, 32 with its peripheral edge portion 18 accurately aligned relative to the peripheral cavity portions 36, 37 and with the shelf brackets 25 properly located in the laterally spaced parallel side cavity portions 55, 55. As the highly pressurized injected polymeric/copolymeric material enters the polygonal peripheral cavity portion 39 at each of the four locations (L1–L4) shown in FIG. 4, the plastic material flows in opposite directions, as indicated by the broken double headed arrows (A1–A4) associated therewith, with appropriate air being conventionally vented from the mold cavity 35. Due to the location of the injectors 60 essentially at the corners (C1–C4) of the polygonal peripheral cavity portion 39, the effect of the highly pressurized plastic material injected from each injector 60 is to flow in opposite directions toward the next adjacent injector 60 with the forces created by the pressurized plastic being effective to essentially self center or hold self-centered the glass panel 15 by applying the forces of the plastic material equally against the peripheral edge portion 18 of the glass panel 15 thereby substantially precluding its shifting within the mold cavity 15. Since the side cavity portions 25 are in communication with the polygonally shaped peripheral cavity portion 39, the plastic material in the latter flows into both of the former thereby partially encasing each of the shelf brackets 25, as is best shown in FIGS. 1 and 2, including flowing through a plurality of circular holes 45 of the shelf brackets 25, as is shown in FIG. 2.

Once the plastic material solidifies, the solidified frame or border 20 is formed bounding the polygonal peripheral edge 18 of the glass panel 15, and the cross-sectional configuration of the frame or border 20 is essentially consistent throughout due to the location of the injectors 60 and the centralizing effect created by the pressurized injected polymeric/copolymeric material upon the glass panel 15 during the injection operation. Obviously, upon the solidification of the frame or border 20, the shelf 10 can be removed from the cavity 35 upon the opening of the mold bodies 31, 32 of the mold 30, and the process can then again be repeated by inserting another glass panel 15 and shelf brackets 25, 25 into the mold cavity 35, closing the latter, injecting the plastic and repeating the cycle.

A refrigerator shelf 10 constructed in accordance with the method just described is approximately 24 inches in outside length and 13½ inches in outside width, thus imparting the generally polygonal/rectangular configuration thereto. The center of each of the locations L1–L4 of the injection points or orifices is approximately one inch from the most adjacent side of the shelf, thus establishing the distances between the locations L1, L2 and L3, L4 of approximately 22³⁄₁₆ inches. Cross sections of the border or frame 20, corresponding generally to that illustrated in FIG. 6, were essentially consistent and uniform, thus evidencing the self-centering characteristics of the molding method herein described.

Although a preferred embodiment of the invention has been specifically illustrated and described herein, it is to be understood that minor variations may be made in the apparatus without departing from the spirit and scope of the invention, as defined the appended claims.

What is claimed is:

1. A method of forming a shelf including a generally flat polygonal support, a pair of shelf brackets and a peripheral border at least along portions of which the brackets are united to the flat support comprising the steps of providing a mold having a cavity including a polygonal peripheral cavity portion corresponding substantially to a peripheral edge portion of the flat polygonal support and generally parallel laterally spaced cavity portions each merging with the polygonal peripheral cavity portion, placing the flat polygonal support in the cavity with its peripheral edge portion located in the polygonal peripheral cavity portion, placing one shelf bracket in each lateral cavity portion with an upper edge of each shelf bracket being adjacent the flat polygonal support peripheral edge, introducing material under pressure into the polygonal peripheral cavity portion at a plurality of peripherally spaced positions and applying forces created by the introduced pressurized material against the peripheral edge portion of the flat polygonal support and maintaining the flat polygonal support substantially in mating conformity with the polygonal peripheral cavity portion by the introduced pressurized material whereby a relatively consistently contoured border is formed about the peripheral edge portion of the flat polygonal support, the pressurized material introduced into the polygonal peripheral cavity portion also enters the lateral cavity portions and at least partially encapsulates the shelf brackets, and effecting the solidification of the material to form a peripheral shelf border unitizing the flat polygonal peripheral support and the shelf brackets.

2. The method as defined in claim 1 wherein the polygonal peripheral cavity portion is of a substantially rectangular configuration.

3. The method as defined in claim 1 including the step of interlocking the shelf brackets to the peripheral shelf border coincident with the performance of the material injection steps and the subsequent solidification of the material.

4. The method as defined in claim 1 including the step of providing the shelf brackets each with at least one relief area and interlocking the shelf brackets at the relief areas by the material which enters the lateral cavity portions coincident with the performance of the material injection step and the subsequent solidification of the material.

5. The method as defined in claim 1 including the step of providing the shelf brackets each with at least one opening and interlocking the shelf brackets at the openings by the material which enters the lateral cavity portions coincident with the performance of the material injection step and the subsequent solidification of the material.

6. The method as defined in claim 1 wherein each of the plurality of peripherally spaced positions is contiguous a corner of the polygonal peripheral cavity portion.

7. The method as defined in claim 2 wherein each of the plurality of peripherally spaced positions is contiguous a corner of the polygonal peripheral cavity portion.

8. The method as defined in claim 3 wherein each of the plurality of peripherally spaced positions is contiguous a corner of the polygonal peripheral cavity portion.

9. The method as defined in claim 4 wherein each of the plurality of peripherally spaced positions is contiguous a corner of the polygonal peripheral cavity portion.

10. The method as defined in claim 5 wherein each of the plurality of peripherally spaced positions is contiguous a corner of the polygonal peripheral cavity portion.

11. The method as defined in claim 1 wherein each of the plurality of peripherally spaced positions is substantially the same at each corner of the polygonal peripheral cavity portion.

12. The method as defined in claim 1 wherein each of the plurality of peripherally spaced positions is along longer sides of the polygonal peripheral cavity portion.

13. The method as defined in claim 1 wherein each of the plurality of peripherally spaced positions is along longer sides of the polygonal peripheral cavity portion and substantially equidistance from the most adjacent corner of the polygonal peripheral cavity portion.

14. A method of forming a border along a peripheral edge portion of an article comprising the steps of providing an article having a peripheral edge portion, providing a mold having a cavity including a substantially continuous peripheral portion corresponding substantially to the configuration of the article peripheral edge portion, positioning the article with its peripheral edge portion in the cavity peripheral portion, and introducing hot flowable material under substantially high pressure into the cavity peripheral portion at a plurality of peripherally spaced positions which substantially fills the entirety of the substantially continuous cavity peripheral portion and thereby applies forces created by the introduced highly pressurized material against the article peripheral edge portion to maintain the article in substantially aligned mating conformity with the cavity peripheral portion by the introduced pressurized material whereby a relatively consistently contoured border is formed about the article peripheral edge portion.

15. The method as defined in claim 14 wherein the article is of a substantially polygonal configuration, the cavity peripheral portion includes cavity corner portions corresponding to the polygonal configuration of the article, and the introducing of the material into the peripheral cavity portion occurs substantially at least at two of the cavity corner portions.

16. The method as defined in claim 14 wherein the article is of a substantially polygonal configuration, the cavity peripheral portion includes cavity corner portions corresponding to the polygonal configuration of the article, and the introducing of the material into the peripheral cavity portion occurs substantially at each of the cavity corner portions.

17. The method as defined in claim 14 wherein the article is glass.

18. The method as defined in claim 14 wherein the article is a glass shelf.

19. The method as defined in claim 14 wherein the article is a refrigerator glass shelf.

20. The method as defined in claim 16 wherein the location of the introduction of the material is substantially the same at each cavity corner portion.

21. The method as defined in claim 16 wherein the location of the introduction of the material is along longer sides of the cavity peripheral portion.

22. The method as defined in claim 16 wherein the location of the introduction of the material is along longer sides of the cavity peripheral portion and substantially equidistant from the most adjacent cavity corner portion.

23. A method of forming a border along a peripheral edge portion of an article comprising the steps of providing an article having a peripheral edge portion, providing a mold having a cavity including a substantially continuous peripheral portion corresponding substantially to the configuration of the article peripheral edge portion, positioning the article with its peripheral edge portion in the cavity peripheral portion, and introducing hot flowable material under substantially high pressure into the cavity peripheral portion at a plurality of peripherally spaced positions constructed and arranged to substantially entirely fill the continuous cavity peripheral portion and thereby apply forces created by the highly pressurized material against the article peripheral edge portion which maintains the article in substantially mating conformity with the cavity peripheral portion whereby a relatively consistently contoured border is formed about the article peripheral edge portion.

24. The method as defined in claim 23 wherein the article is of a substantially polygonal configuration, the cavity peripheral portion includes cavity corner portions corresponding to the polygonal configuration of the article, and the introducing of the material into the peripheral cavity portion occurs substantially at least at two of the cavity corner portions.

25. The method as defined in claim 23 wherein the article is of a substantially polygonal configuration, the cavity peripheral portion includes cavity corner portions corresponding to the polygonal configuration of the article, and the introducing of the material into the peripheral cavity portion occurs substantially at each of the cavity corner portions.

26. The method as defined in claim 23 wherein the article is glass.

27. The method as defined in claim 23 wherein the article is a glass shelf.

28. The method as defined in claim 23 wherein the article is a refrigerator glass shelf.

29. The method as defined in claim 25 wherein the location of the introduction of the material is substantially the same at each cavity corner portion.

30. The method as defined in claim 25 wherein the location of the introduction of the material is along longer sides of the cavity peripheral portion.

31. The method as defined in claim 24 wherein the location of the introduction of the material is along longer sides of the cavity peripheral portion and substantially equidistant from the most adjacent cavity corner portion.

32. A method of forming an article including a support and a peripheral border integrally and homogeneously united to the support comprising the steps of providing a mold having a cavity including a cavity peripheral portion corresponding substantially to a peripheral edge portion of the support, placing the support in the cavity with the support peripheral edge portion located in the cavity peripheral portion, introducing material under pressure into the cavity peripheral portion at a plurality of peripherally spaced positions and applying forces created by the introduced pressurized material against the peripheral edge portion of the support to thereby self-center and align the support substantially in mating conformity with the cavity peripheral portion by the introduced pressurized material whereby a relatively consistently contoured border is formed about the peripheral edge portion of the support, and effecting the solidification of the material to form a peripheral border circumscribing the support.

33. The method as defined in claim 32 wherein the cavity peripheral portion is of a substantially rectangular configuration.

34. The method as defined in claim 32 wherein each of the plurality of peripherally spaced positions is contiguous a corner of the cavity peripheral portion.

35. The method as defined in claim 33 wherein each of the plurality of peripherally spaced positions is contiguous a corner of the cavity peripheral portion.

36. The method as defined in claim 32 wherein each of the plurality of peripherally spaced positions is located substantially the same at each corner of the cavity peripheral portion.

37. The method as defined in claim 32 wherein each of the plurality of peripherally spaced positions is along longer sides of the cavity peripheral portion.

38. The method as defined in claim 36 wherein each of the plurality of peripherally spaced positions is along longer sides of the cavity peripheral portion.

39. The method as defined in claim 14 wherein high pressure of the hot material in the substantially filled cavity peripheral portion automatically self-centers the article in the cavity.

40. The method as defined in claim 23 wherein high pressure of the hot material in the substantially filled cavity peripheral portion automatically self-centers the article in the cavity.

* * * * *